(12) United States Patent
De Preville et al.

(10) Patent No.: US 12,034,305 B2
(45) Date of Patent: Jul. 9, 2024

(54) RELATING TO POWER TRANSMISSION NETWORKS (71) Applicant: General Electric Technology GmbH, Baden (CH)

(72) Inventors: Guillaume De Preville, Elancourt (FR); Julian Freytes, Versailles (FR); Jiaqi Li, Massy (FR); Marc Thouvenin, Massy (FR); Omar Jasim, Stafford (GB)

(73) Assignee: GE Infrastructure Technology LLC, Greenville, SC (US)

( * ) Notice: Subject to any disclaimer, the term of this patent is extended or adjusted under 35 U.S.C. 154(b) by 259 days.

(21) Appl. No.: 17/485,246

(22) Filed: Sep. 24, 2021

(65) Prior Publication Data

US 2022/0102979 A1 Mar. 31, 2022

(30) Foreign Application Priority Data

Sep. 25, 2020 (EP) .................................... 20275149

(51) Int. Cl.
*H02M 7/483* (2007.01)
*H02J 3/36* (2006.01)
*H02J 3/38* (2006.01)

(52) U.S. Cl.
CPC ............. *H02J 3/36* (2013.01); *H02M 7/4835* (2021.05); *H02J 3/381* (2013.01); *H02J 2300/28* (2020.01)

(58) Field of Classification Search
CPC .......... H02M 5/40; H02M 5/42; H02M 5/453; H02M 7/7575; H02M 5/458; H02M 5/45; H02M 5/4585; H02M 5/4505; H02M 5/451; H02M 5/452; H02M 5/447; H02M 5/456; H02M 1/12; H02M 1/4266; H02M 2001/123; H02M 3/073; H02M 3/10; H02M 3/135; H02M 3/137; H02M 3/28; H02M 3/315; H02M 3/3155; H02M 3/325; H02M 3/335; H02M 7/10; H02M 7/515; H02M 7/521; H02M 7/53; H02M 7/537; H02M 7/5383; H02M 7/538466; H02M 7/53862;
(Continued)

(56) References Cited

U.S. PATENT DOCUMENTS 10,027,253 B2 * 7/2018 Jasim ..................... H02M 7/217
10,199,954 B2 * 2/2019 Trainer ............... H02M 7/4835
(Continued)

FOREIGN PATENT DOCUMENTS

EP 3322062 A1 * 5/2018 ................ H02J 3/36

OTHER PUBLICATIONS

Belhaouane et al: "Modeling and Analysis of Modular Multilevel Converters connected to Weak AC Grids", 2019 21st European Conference on Power Electronics and Applications (EPE '19 ECCE Europe), EPE Association, Sep. 3, 2019.
(Continued)

*Primary Examiner* — Kevin J Comber
*Assistant Examiner* — Nusrat Quddus
(74) *Attorney, Agent, or Firm* — Eversheds Sutherland (US) LLP (57) ABSTRACT

In the field of high voltage direct current (HVDC) power transmission networks, there is a need for improvements to allow a single power converter to control individual AC network voltages carried by multiple AC transmission conduits to multiple AC network elements, such as respective wind parks.

20 Claims, 6 Drawing Sheets

(58) Field of Classification Search
CPC .......... H02M 7/5387; H02M 7/53871; H02M 7/53875; H02M 7/757; H02M 7/79; H02M 3/337; H02M 3/338; H02M 3/3382; H02M 3/3384; H02M 7/538; H02M 7/53806; H02M 7/53832; H02M 7/53835; H02M 7/487; H02M 7/539; H02M 7/23; H02M 7/217; H02M 7/21; H02M 7/12; H02M 7/04; H02M 7/00; H02H 7/261; H02H 7/268; H02J 3/36; H02J 3/01

See application file for complete search history.

(56) References Cited

U.S. PATENT DOCUMENTS

| | | | | |
|---|---|---|---|---|
| 10,530,160 | B2* | 1/2020 | Adamczyk | H02J 3/381 |
| 2017/0009744 | A1* | 1/2017 | Brogan | G05F 1/455 |
| 2018/0175744 | A1* | 6/2018 | Jasim | H02M 1/14 |
| 2018/0301895 | A1* | 10/2018 | Sri Gopala Krishna Murthi | G01R 31/081 |
| 2023/0082909 | A1* | 3/2023 | Barker | H02J 3/00125 307/82 |
| 2023/0253796 | A1* | 8/2023 | Narayanan | H02M 7/12 363/68 |
| 2023/0318301 | A1* | 10/2023 | Kumar | H02J 3/48 307/82 |
| 2023/0327427 | A1* | 10/2023 | Kumar | H02J 3/36 361/42 |

OTHER PUBLICATIONS

Xuan Li et al: "Study on Fault Ride-Through Capability of Wind Farm Integration Using MMC-HVDC", 2014 International Conference on Power System Technology, IEEE, Oct. 20, 2014, pp. 2596-2601.

Li Yingbiao et al: "Over-Voltage Suppression Methods for the MMC-VSC-HVDC Wind Farm Integration System", IEEE Transactions on Circuits and Systems II: Express Briefs, vol. 67, No. 2, Apr. 15, 2019, pp. 355-359.

European Search Report for Application No. 20275149.1-1202 dated Mar. 19, 2021.

* cited by examiner

RELATING TO POWER TRANSMISSION NETWORKS

CROSS-REFERENCE TO RELATED APPLICATION

This application claims the priority benefit of European Application No. 20275149.1, titled "IMPROVEMENTS IN OR RELATING TO POWER TRANSMISSION NETWORKS", filed Sep. 25, 2020, which is incorporated herein by reference in its entirety.

This invention relates to a power transmission network and to a method of controlling such a network.

In high voltage direct current (HVDC) power transmission networks AC power is typically converted to DC power for transmission via overhead lines, under-sea cables and/or underground cables. This conversion removes the need to compensate for the AC capacitive load effects imposed by the power transmission conduit, i.e. the transmission line or cable, and reduces the cost per kilometre of the lines and/or cables, and thus becomes cost-effective when power needs to be transmitted over a long distance. DC power can also be transmitted directly from offshore wind parks to onshore AC power transmission networks.

The conversion between DC power and AC power is utilised where it is necessary to interconnect DC and AC networks. In any such power transmission network, converters (i.e. power converters) are required at each interface between AC and DC power to effect the required conversion from AC to DC or from DC to AC.

According to a first aspect of the invention there is provided a power transmission network comprising a power converter having first and second DC converter terminals for connection in use to a DC network and an AC converter terminal electrically connected to a plurality of AC transmission conduits each of which is for connection in use to a respective AC network element configured to operate at a respective individual AC network voltage, the power converter including a primary converter controller programmed in use to control the transfer of power through the power converter and thereby between the DC network and the plurality of AC network elements, and the primary converter controller being further programmed in use to control each individual AC network voltage by establishing a virtual voltage representative of the plurality of AC network voltages and altering a single AC converter voltage produced by the power converter at the AC converter terminal to adjust the virtual voltage and thereby adjust each individual AC network voltage.

Such an arrangement is advantageous because it allows a single power converter, i.e. a single power converter with only a single AC output which is therefore able to produce only a single AC converter voltage, to nevertheless control the individual AC network voltages carried by multiple AC transmission conduits to multiple AC network elements, such as respective wind parks.

The ability to control multiple AC network voltages using only a single power converter provides considerable benefits in terms of capital cost savings because of the absence of a need for further power converters, e.g. for each AC network voltage, as well as a reduction in the space required for a given power transmission network installation (and hence also the cost of such an installation).

Preferably the primary converter controller is programmed to establish a virtual voltage commensurate with the average of the individual AC network voltages.

Establishing such a virtual voltage helps to ensure that each individual AC network voltage in taken into account in a manner that can be readily measured, while nevertheless ensuring that the impact of any alteration in the AC converter voltage is captured in respect of each such AC network voltage.

The primary converter controller may be programmed to establish the virtual voltage in a vector form having real and imaginary parts.

The inclusion of a primary converter controller which is programmed to establish the virtual voltage in a vector form having real and imaginary parts, allows the resulting virtual voltage vector to be observed from the perspective of a rotating dq-frame that tracks movement of the vector in a manner that characterises each of the alternating AC network voltages as a DC-like property. This, in turn, allows the resulting virtual vector to be controlled in a similar manner to the voltage and current of a DC system, and so facilitates the desired adjustment of each individual AC network voltage by altering the single AC converter voltage produced by the power converter at the AC converter terminal.

Optionally the primary converter controller is additionally programmed to compare the established virtual voltage with a predetermined virtual voltage reference and to alter the AC converter voltage produced by the power converter to reduce any difference between the established virtual voltage and the predetermined virtual voltage reference.

Additionally programming the primary converter controller in the foregoing manner creates a feedback control loop which drives the established virtual voltage to match the desired predetermined virtual voltage reference by modifying the AC converter voltage the power converter is controlled to produce, and hence establishes closed loop control of the individual AC network voltages.

In another preferred embodiment of the invention, when altering the AC converter voltage produced by the power converter to reduce any difference between the established virtual voltage and the predetermined virtual voltage reference, the primary converter controller takes into account:

(i) a voltage difference across a converter reactance; and
(ii) a virtual voltage difference representative of a plurality of voltage differences across a conduit reactance of each AC transmission conduit.

Such programming of the primary converter controller helps to ensure that altering the AC converter voltage the power converter produces adjusts the individual AC network voltages in the desired manner.

Preferably the virtual voltage difference is commensurate with the average voltage difference across the conduit reactances of the AC transmission conduits.

Configuring the virtual voltage difference in the foregoing manner accurately takes into account the actual voltage differences across the conduit reactances of each individual AC transmission conduit.

The primary converter controller may be programmed to take into account cross-coupling between the real and imaginary parts of the voltage difference and the virtual voltage difference.

Having the primary converter controller take into account the cross-coupling between the real and imaginary parts of the voltage difference and the virtual voltage difference, helps to ensure that the actual voltage differences across the inductance of each individual AC transmission conduit are taken into account in a manner consistent with the form in which the virtual voltage is established.

In another preferred embodiment of the invention the power converter further includes a secondary converter controller programmed in use to establish the predetermined virtual voltage reference against which the primary converter controller compares the established virtual voltage.

The inclusion of a secondary converter controller, programmed in the aforementioned manner, allows the power converter to exhibit an increased degree of control over the individual AC network voltages.

Optionally the second converter controller establishes the virtual voltage reference in a manner aimed at maintaining all of the individual AC network voltages within a desired voltage range.

Such a secondary converter controller allows the power converter to deal with unwanted deviations of one or more of the AC network voltages.

Preferably the secondary converter controller:
(i) considers whether any AC network voltage is below a predetermined voltage minimum and if one or more AC network voltages is below the voltage minimum modifies the virtual voltage reference to raise the or each errant AC network voltage to be equal to or above the voltage minimum; and
(ii) considers whether any AC network voltage is above a predetermined voltage maximum and if one or more AC network voltages is above the voltage maximum modifies the virtual voltage reference to reduce the or each errant AC network voltage to be equal to or below the voltage maximum.

Configuring, i.e. programming, the secondary converter controller in the foregoing manner permits the power converter to maintain the AC network voltages within predetermined voltage minimum and voltage maximum, solely by adjusting the AC converter voltage it produces.

In a still further preferred embodiment of the invention the secondary converter controller receives in use a virtual voltage command from a higher-level controller and modifies the virtual voltage reference it establishes by determining an adjustment factor and applying the adjustment factor to the received virtual voltage command.

Such an arrangement allows overall setting of the AC network voltages to be done remotely from the power converter, while still allowing the power converter to exercise finite adjustment of those voltages.

Optionally, if at least one AC network voltage is below the voltage minimum and at least one AC network voltage is above the voltage maximum, the secondary converter controller is programmed to modify the virtual voltage reference in a manner that equalises the amount the or each said AC network voltage deviates from the corresponding voltage minimum and voltage maximum.

A benefit of equalising the amount to which respective AC network voltages deviate from the predetermined voltage minimum and voltage maximum is that avoiding excessive over- or under-voltages helps to minimise losses and/or dielectric stresses in the associated AC transmission conduits and AC network elements.

According to a second aspect of the invention there is provided a method of controlling a power transmission network comprising a power converter having first and second DC converter terminals for connection in use to a DC network and an AC converter terminal electrically connected to a plurality of AC transmission conduits each of which is for connection in use to a respective AC network element configured to operate at a respective individual AC network voltage, the power converter including a primary converter controller programmed in use to control the transfer of power through the power converter and thereby between the DC network and the plurality of AC network elements, the method comprising the steps of:

controlling each individual AC network voltage by establishing a virtual voltage representative of the plurality of AC network voltages; and altering a single AC converter voltage produced by the power converter at the AC terminal to adjust the virtual voltage and thereby adjust each individual AC network voltage.

The method of the invention shares the advantages of the corresponding features of the power transmission network of the invention.

It will be appreciated that the use of the terms "first" and "second", and the like, in this patent specification is merely intended to help distinguish between similar features (e.g. the first and second DC converter terminals), and is not intended to indicate the relative importance of one feature over another feature, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

There now follows a brief description of preferred embodiments of the invention, by way of non-limiting example, with reference being made to the following figures in which.

Figure 1:
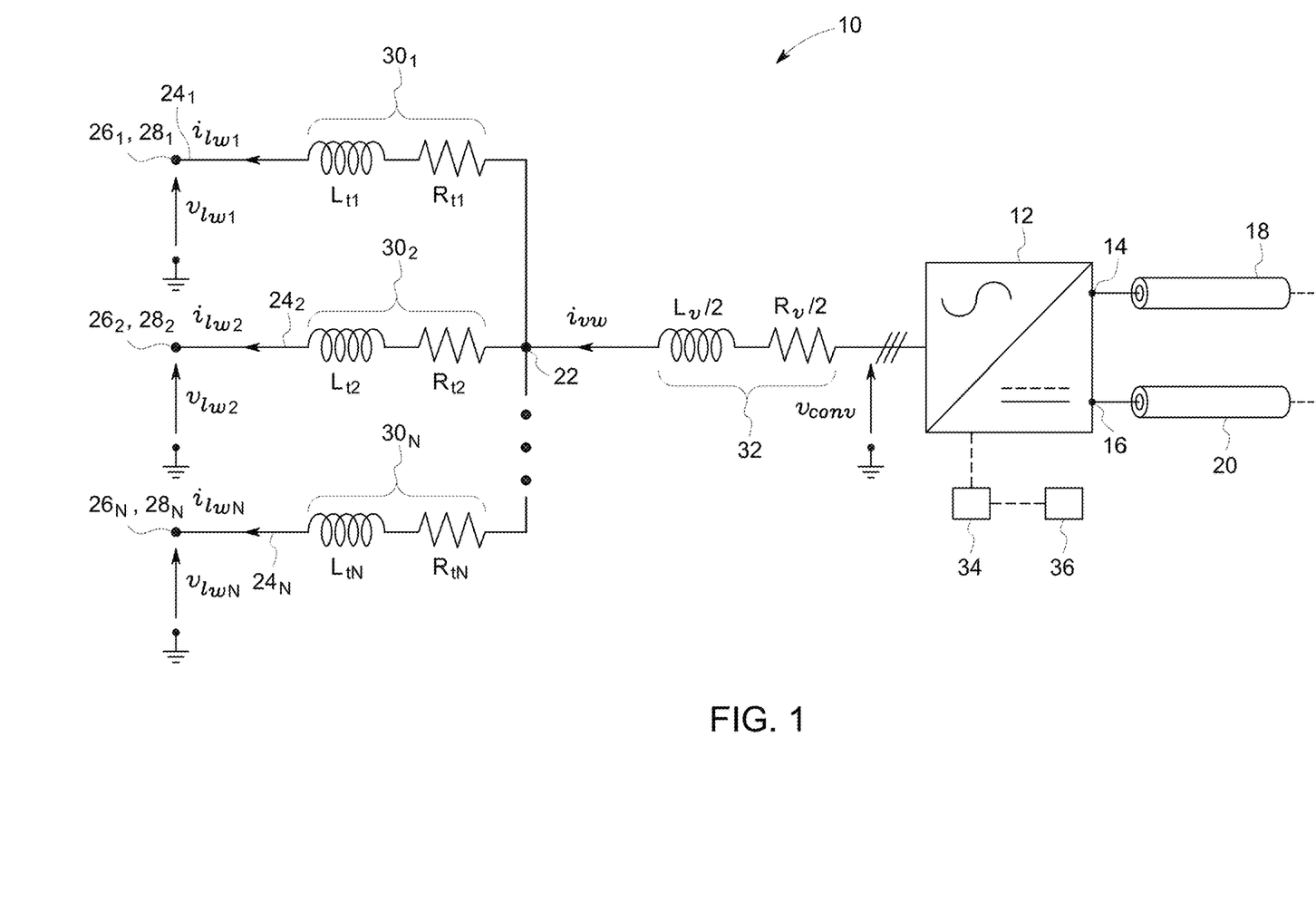
FIG. 1 shows a schematic view of an idealised power transmission network according to a first embodiment of the invention.

A power transmission network according to a first embodiment of the invention is designated generally by reference numeral 10, as shown in FIG. 1.

The first power transmission network 10 includes a power converter 12, such as a voltage source converter, although other types of power converter may be included instead.

In any event, the power converter 12 has first and second DC converter terminals 14, 16 which, in use, are connected to a DC network (not shown), e.g. via respective first and second DC transmission conduits 18, 20 in the form of respective transmission lines, although other forms of interconnection are possible.

The power converter 12 also includes an AC converter terminal 22 that is electrically connected to a plurality of AC transmission conduits, i.e. first, second and nth AC transmission conduits $24_1$, $24_2$, ... $24_N$.

Each AC transmission conduit $24_1$, $24_2$, $24_N$ is, in use, connected to a respective AC network element $26_1$, $26_2$, $26_N$, such as corresponding first, second or nth wind park $28_1$, $28_2$, $28_N$ (either offshore or onshore). Each such AC network element $26_1$, $26_2$, $26_N$, e.g. each such first, second or nth wind park $28_1$, $28_2$, $28_N$, is configured to operate at a respective individual AC network voltage $v_{lw1}$, $v_{lw2}$, $v_{lwN}$.

Each AC transmission conduit $24_1$, $24_2$, $24_N$ includes, in an idealised sense, a conduit reactance $30_1$, $30_2$, $30_N$, in the form of a series-connected conduit inductance $L_{t1}$, $Lv_{t2}$, $L_{tN}$ and conduit resistance $R_{t1}$, $RV_{t2}$, $R_{tN}$.

In a similar sense, the power converter 12 includes a converter reactance 32 in the form of a series-connected converter inductance $$\frac{L_v}{2}$$

and converter resistance $$\frac{R_v}{2}.$$

In addition, the power converter 12 includes primary and secondary converter controllers 30, 32.

The primary converter controller 34 is programmed, in use, to control the transfer of power through the power converter 12 and thereby between the DC network and the plurality of AC network elements $26_1$, $26_2$, $26_N$.

The primary converter controller 34 is further programmed, in use, to control each individual AC network voltage $v_{lw1}$, $v_{lw2}$, $v_{lwN}$, and does so by establishing a virtual voltage which is representative of the AC network voltages $v_{lw1}$, $v_{lw2}$, $v_{lwN}$. The primary converter controller 34 then alters a single AC converter voltage $v_{conv}$, which is produced by the power converter 12 at the AC converter terminal 22, to adjust the virtual voltage and thereby adjust each individual AC network voltage $v_{lw1}$, $v_{lw2}$, $v_{lwN}$.

More particularly, the primary converter controller 34 is programmed to establish a virtual voltage that is commensurate with the average of the individual AC network voltages $v_{lw1}$, $v_{lw2}$, $v_{lwN}$, and to establish such a virtual voltage in a vector form that has real and imaginary parts, i.e. to establish a virtual voltage vector.

For example, if Kirchhoff's voltage law is applied across the conduit reactances $30_1$, $30_2$, $30_N$ and the converter reactance 32, the following equation is obtained $$v_{conv} - \left(\frac{1}{N}\sum_{k=1}^{N} v_{lwk}\right) = \frac{L_v}{2}\frac{di_{vw}}{dt} + \frac{R_v}{2}i_{vw} + \frac{1}{N}\sum_{k=1}^{N}\left(L_{tk}\frac{di_{vwk}}{df} + R_{tk}i_{vwk}\right)$$

where, $$\frac{1}{N}\sum_{k=1}^{N} v_{lwk}$$

is the average or the individual AC network voltages $v_{lw1}$, $v_{lw2}$, $v_{lwN}$;

$$\frac{L_v}{2}\frac{di_{vw}}{dt} + \frac{R_v}{2}i_{vw}$$

is the voltage difference across the converter reactance 32; and $$\frac{1}{N}\sum_{k=1}^{N}\left(L_{tk}\frac{di_{vwk}}{dt} + R_{tk}i_{vwk}\right)$$

is the average voltage difference across the conduit reactances $30_1$, $30_2$, $30_N$, with $$\frac{di_{vw}}{dt}$$

being the rate or change of a converter current $i_{vw}$ flowing through the converter reactance 32; and $$\frac{di_{vwk}}{dt}$$

being the rate of change of a conduit current $i_{lw1}$, $i_{lw2}$, $i_{lwN}$ flowing through a respective conduit reactance $30_1$, $30_2$, $30_N$.

It is therefore possible to establish the following virtual voltage which is commensurate with the average of the individual AC network voltages $v_{lw1}$, $v_{lw2}$, $v_{lwN}$, i.e.:

$$\frac{1}{N}\sum_{k=1}^{N} v_{lwk}$$

Moreover, converting the above-mentioned, Kirchhoff derived, equation into a vector form within a rotating dq-frame, gives $$v_{convdqpn} - \left(\frac{1}{N}\sum_{k=1}^{N} v_{lvdqpnk}\right) = \frac{L_v}{2}\frac{di_{vwdqpn}}{dt} + \frac{R_v}{2}i_{vwdqpn} +$$

$$\frac{1}{N}\sum_{k=1}^{N}\left(L_{tk}\frac{di_{vwdqpnk}}{dt} + R_{tk}i_{vwdqpnk}\right) + \left(\frac{L_v}{2}Ji_{vwdqpn} + \frac{1}{N}\sum_{k=1}^{N}(JL_{tk}i_{vwdqpnk})\right)$$

where, $v_{convdqpn}$ is an AC converter voltage vector that controls the power converter 12 to produce the required AC converter voltage $v_{conv}$ at the AC converter terminal 22;

$$\frac{1}{N}\sum_{k=1}^{N} v_{lvdqpnk}$$

is the virtual voltage vector that can be established by the primary converter controller 34; and $$J = \begin{bmatrix} 0 & \omega & 0 & 0 \\ -\omega & 0 & 0 & 0 \\ 0 & 0 & 0 & -\omega \\ 0 & 0 & \omega & 0 \end{bmatrix}$$

which represents cross-coupling between the real and imaginary, i.e. real power and reactive power, parts of the converter reactance 32 and the respective conduit reactances $30_1$, $30_2$, $30_N$,
with,
ω being the angular frequency of the rotating dq-frame.

The primary converter controller 34 is additionally programmed to compare the established virtual voltage, i.e. the established virtual voltage vector $$\frac{1}{N}\sum_{k=1}^{N} v_{lwdqpnk}$$

with a predetermined virtual voltage reference, i.e. with a predetermined virtual voltage reference vector $v_{dqpn}^*$, and to alter the AC converter voltage $v_{conv}$ produced by the power converter 12, i.e. by altering the AC converter voltage vector $v_{convdqpn}$ that controls the power converter 12, to reduce any difference between the established virtual voltage vector and the predetermined virtual voltage reference vector $v_{dqpn}^*$.

In addition, when altering the AC converter voltage $v_{conv}$ produced by the power converter to reduce any difference between the established virtual voltage vector and the predetermined virtual voltage reference vector $v_{dqpn}^*$, the primary converter controller 34 is further programmed to take into account:
  (i) the voltage difference across the converter reactance 32, e.g. take into account $$\frac{L_v}{2}\frac{di_{vwdqpn}}{dt} + \frac{R_v}{2}i_{vwdqpn}; \text{ and}$$

$$\frac{L_v}{2}Ji_{vwdqpn}$$

and
  (ii) a virtual voltage difference that is representative of the plurality of voltage differences across the conduit reactance $30_1$, $30_2$, $30_N$ of each AC transmission conduit AC transmission conduit $24_1$, $24_2$, $24_N$, and which is commensurate with the average voltage difference across the conduit reactances $30_1$, $30_2$, $30_N$, e.g. take into account $$+\frac{1}{N}\sum_{k=1}^{N}\left(L_{tk}\frac{di_{vwdqpnk}}{dt} + R_{tk}i_{vwdqpnk}\right); \text{ and}$$

$$\frac{1}{N}\sum_{k=1}^{N}(JL_{tk}i_{vwdqpnk})$$

Moreover, the primary converter controller 34 is still further programmed to take into account cross-coupling between the real and imaginary parts of the aforementioned voltage difference and the virtual voltage difference.

Accordingly, the primary converter controller 34 need on take into account those elements of the respective voltage difference and virtual voltage difference in which cross-coupling is represented, i.e. only take into account $$\frac{L_v}{2}Ji_{vwdqpn}; \text{ and } \frac{1}{N}\sum_{k=1}^{N}(JL_{tk}i_{vwdqpnk})$$

Figure 2:
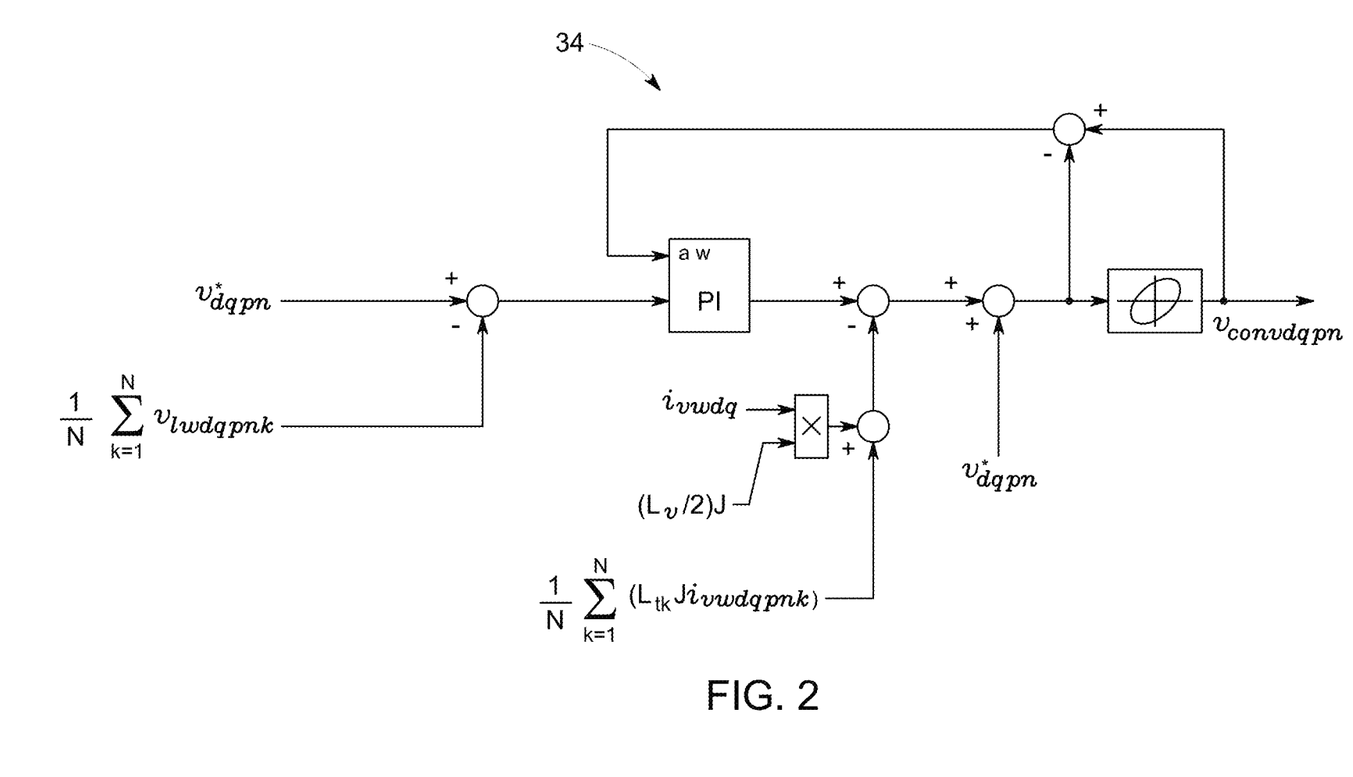
FIG. 2 shows a schematic view of a primary converter controller for a power converter which forms a part of the power transmission network shown in FIG. 1.

One way in which the primary converter controller 34 can be programmed to compare the established virtual voltage vector, i.e.

$$\frac{1}{N}\sum_{k=1}^{N} v_{lwdqpnk}$$

with the predetermined virtual voltage reference vector $v_{dqpn}^*$, and to alter the AC converter voltage vector $v_{dqpn}$, to reduce any difference between the established virtual voltage vector and the predetermined virtual voltage reference vector $v_{dqpn}^*$, is illustrated schematically in FIG. 2.

It is noted that in the schematic programming example illustrated in FIG. 2, the primary converter controller 34 is additionally programmed to take further account of the predetermined virtual voltage reference vector $v_{dqpn}^*$, downstream of other considerations. This optional feature can be used to finetune, i.e. trim, the resulting AC converter voltage vector $v_{condqpn}$ it outputs to control the AC converter voltage $v_{conv}$ produced at the AC converter terminal 22, and thereby control each individual AC network voltage $v_{lw1}$, $v_{lw2}$, $v_{lwN}$.

Meanwhile, in the embodiment shown, the secondary converter controller 36 is programmed, in use, to establish the predetermined virtual voltage reference $v_{dqpn}^*$ that is used by the primary converter controller 34, i.e. against which the primary converter controller 34 compares the established virtual voltage vector, i.e.:

$$\frac{1}{N}\sum_{k=1}^{N} v_{lwdqpnk}$$

More particularly, the second converter controller 36 establishes the virtual voltage reference $v_{dqpn}^*$ in a manner which is aimed at maintaining all of the individual AC network voltages $v_{lw1}$, $v_{lw2}$, $v_{lwN}$ within a desired voltage range.

In the embodiment shown, the secondary converter controller 36 is programmed to achieve this by, firstly, considering whether any AC network voltage $v_{lw1}$, $v_{lw2}$, $v_{lwN}$, i.e. whether any instantaneous average AC network voltage $V_{nw1}^{rms}$, $V_{nw2}^{rms}$, $V_{nwN}^{rms}$, is below a predetermined voltage minimum $V_{min}$ and, if one or more AC network voltages $v_{lw1}$, $v_{lw2}$, $v_{lwN}$ (i.e. one or more instantaneous average AC network voltages $V_{nw1}^{rms}$, $V_{nw2}^{rms}$, $V_{nwM}^{rms}$) is below the voltage minimum $V_{min}$, then the secondary converter controller 36 modifies the virtual voltage reference vector $v_{dqpn}^*$ to raise the or each errant AC network voltage $v_{lw1}$, $v_{lw2}$, $v_{lwN}$ to be equal to or above the voltage minimum $V_{min}$.

Then, secondly, the secondary converter controller 36 considers whether any AC network voltage $v_{lw1}$, $v_{lw2}$, $v_{lwN}$, i.e. any instantaneous average AC network voltage $V_{nw1}^{rms}$, $V_{nw2}^{rms}$, $V_{nwN}^{rms}$, is above a predetermined voltage maximum $V_{max}$ and if one or more AC network voltages $v_{lw1}$, $v_{lw2}$, $v_{lwN}$ (i.e. one or more instantaneous average AC network voltages $V_{nw1}^{rms}$, $V_{nw2}^{rms}$, $V_{nwN}^{rms}$) is above the voltage maximum $V_{max}$, then the secondary converter controller 36 modifies the virtual voltage reference vector $v_{dqpn}^*$ to reduce the or each errant AC network voltage $V_{tw1}^{rms}, V_{tw2}^{rms}, V_{twN}^{rms}$ to be equal to or below the voltage maximum $V_{max}$.

Additionally, if at least one AC network voltage $v_{lw1}, v_{lw2}, v_{lwN}$, i.e. at least one instantaneous average AC network voltage $V_{tw1}^{rms}, V_{tw2}^{rms}, V_{twN}^{rms}$, is below the voltage minimum $V_{min}$ and at least one AC network voltage $V_{lw1}, V_{lw2}, V_{lwN}$, i.e. at least one instantaneous average AC network voltage $V_{tw1}^{rms}, V_{tw2}^{rms}, V_{twN}^{rms}$, is above the voltage maximum $V_{max}$, the secondary converter controller 36 is programmed to modify the virtual voltage reference vector $v_{dqpn}^*$ in a manner that equalises the amount the or each said AC network voltage $v_{lw1}, v_{lw2}, v_{lwN}$ deviates from the corresponding voltage minimum $V_{min}$ and voltage maximum $V_{max}$.

The secondary converter controller 36 shown receives, in use, a virtual voltage command $V_d^*$ from a higher-level controller (not shown), e.g. a controller at a location remote from the power converter 12, such as a control location.

The secondary converter controller 36 modifies the virtual voltage reference it establishes, i.e. the virtual voltage reference vector $v_{dqpn}^*$ it establishes, by determining an adjustment factor $\delta V_d^*$ and applying the adjustment factor $\delta V_d^*$ to the received virtual voltage command $V_d^*$.

Figure 3:
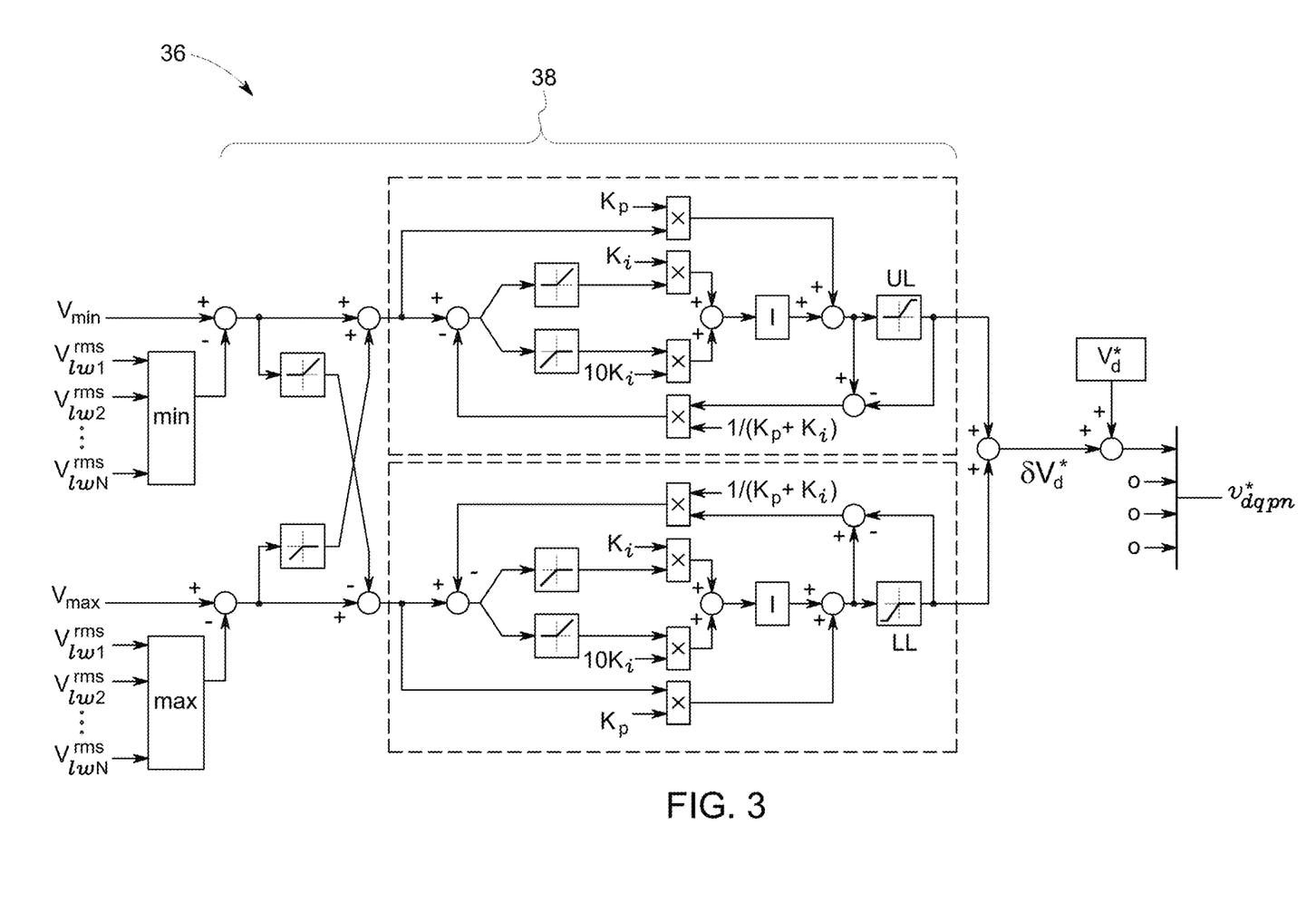
FIG. 3 shows a schematic view of a secondary converter controller for the power converter which forms a part of the power transmission network shown in FIG. 1.

One way in which the secondary converter controller 36 modifies the virtual voltage reference it establishes, i.e. the virtual voltage reference vector $v_{dqpn}^*$ it establishes, by determining an adjustment factor $\delta V_d^*$ and applying the adjustment factor $\delta V_d^*$ to the received virtual voltage command $V_d^*$, while additionally maintaining all of the individual AC network voltages $v_{lw1}, v_{lw2}, v_{lwN}$ within a desired voltage range in the manner set out above, is illustrated schematically in FIG. 3.

As shown in FIG. 3, after comparing each AC network voltage $v_{lw1}, v_{lw2}, v_{lwN}$, i.e. each instantaneous average AC network voltage $V_{tw1}^{rms}, V_{tw2}^{rms}, V_{twN}^{rms}$ with the corresponding predetermined voltage minimum $V_{min}$ and voltage maximum $V_{max}$, the secondary converter controller 36 implements an asymmetric proportional integral control regime 38 in order to establish the aforementioned re-centring of the AC network voltages $v_{lw1}, v_{lw2}, v_{lwN}$ within the desired voltage ranged defined by voltage minimum $V_{min}$ and voltage maximum $V_{max}$ limits.

Figure 4A:
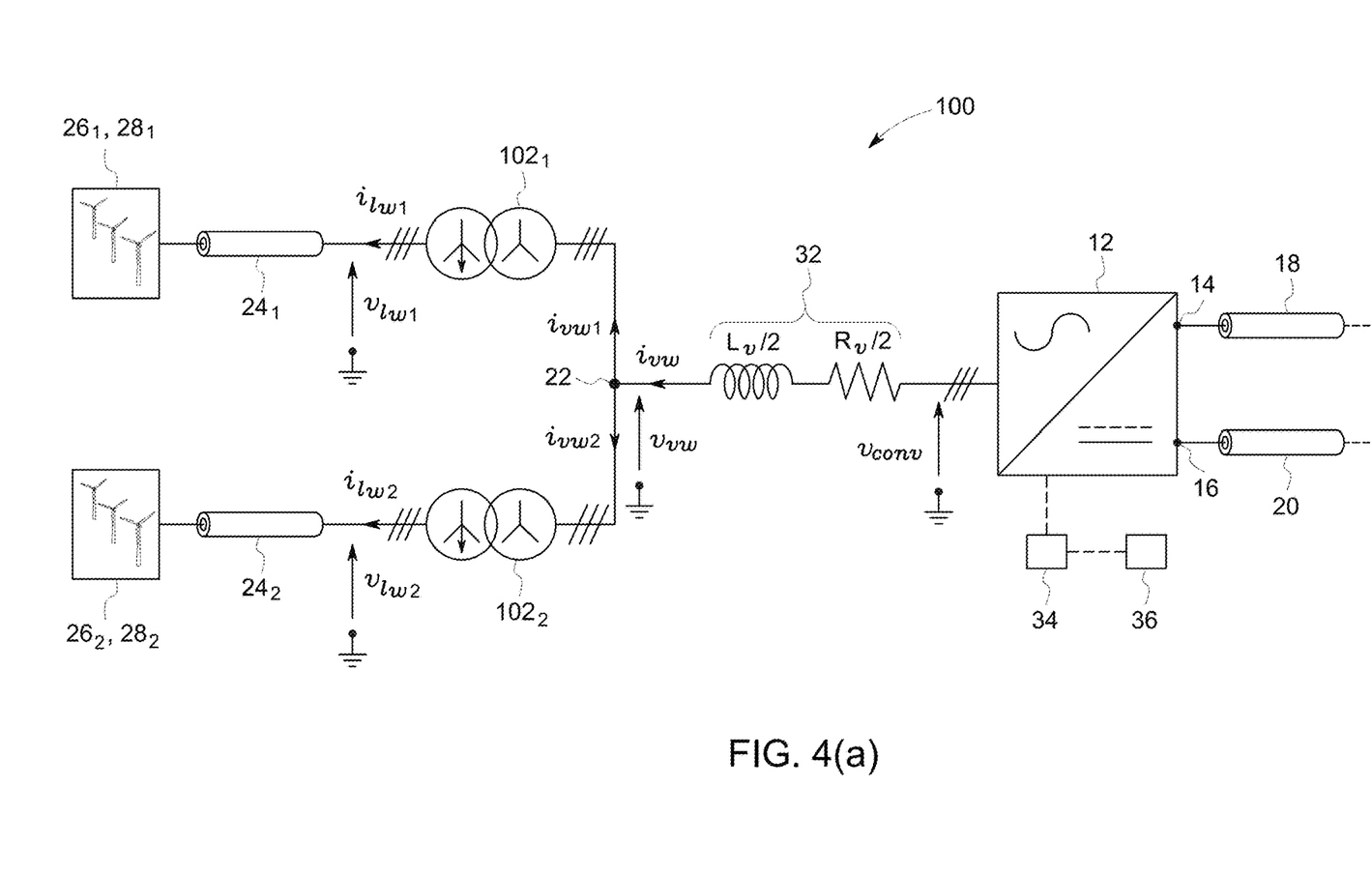
FIG. 4(a) shows a schematic view of an example power transmission network according to a second embodiment of the invention.

By way of example of the invention in use, the operation of a power transmission network 100 according to a second embodiment of the invention is illustrated with reference to FIGS. 4(a) to 4(c).

The second power transmission network 100 is very similar to the first power transmission network 10 described herein above, and similarly includes a power converter 12. Other identical features, which the second power transmission network 100 shares with the first power transmission network 10 are also identified by the same reference numerals, i.e. as shown in FIG. 4(a).

However, the AC converter terminal 22 of the power converter 12 in the second power transmission network 100 is instead electrically connected to only two AC transmission conduits, i.e. only first and second AC transmission conduits $24_1, 24_2$.

Each such AC transmission conduit $24_1, 24_2$ is, in turn, connected to a respective first and second AC network element $26_1, 26_2$ in the form of a respective first and second wind park $28_1, 28_2$. Each of the first and second wind parks $28_1, 28_2$ is configured to operate at a corresponding individual first and second AC network voltage $v_{lw1}, v_{lw2}$.

Meanwhile, each of the first and second AC transmission conduits $24_1, 24_2$ includes a corresponding first or second transformer $102_1, 102_2$ which takes the place of the idealised conduit reactance $30_1, 30_2, 30_N$ included in the first exemplary power transmission network 10.

The predetermined voltage minimum $V_{min}$ is set at 0.98 pu, i.e. 2% below the nominal normal desired operating voltage, and the predetermined voltage maximum $V_{max}$ is set at 1.01 pu, i.e. 1% above the nominal normal desired operating voltage.

Figure 4B:
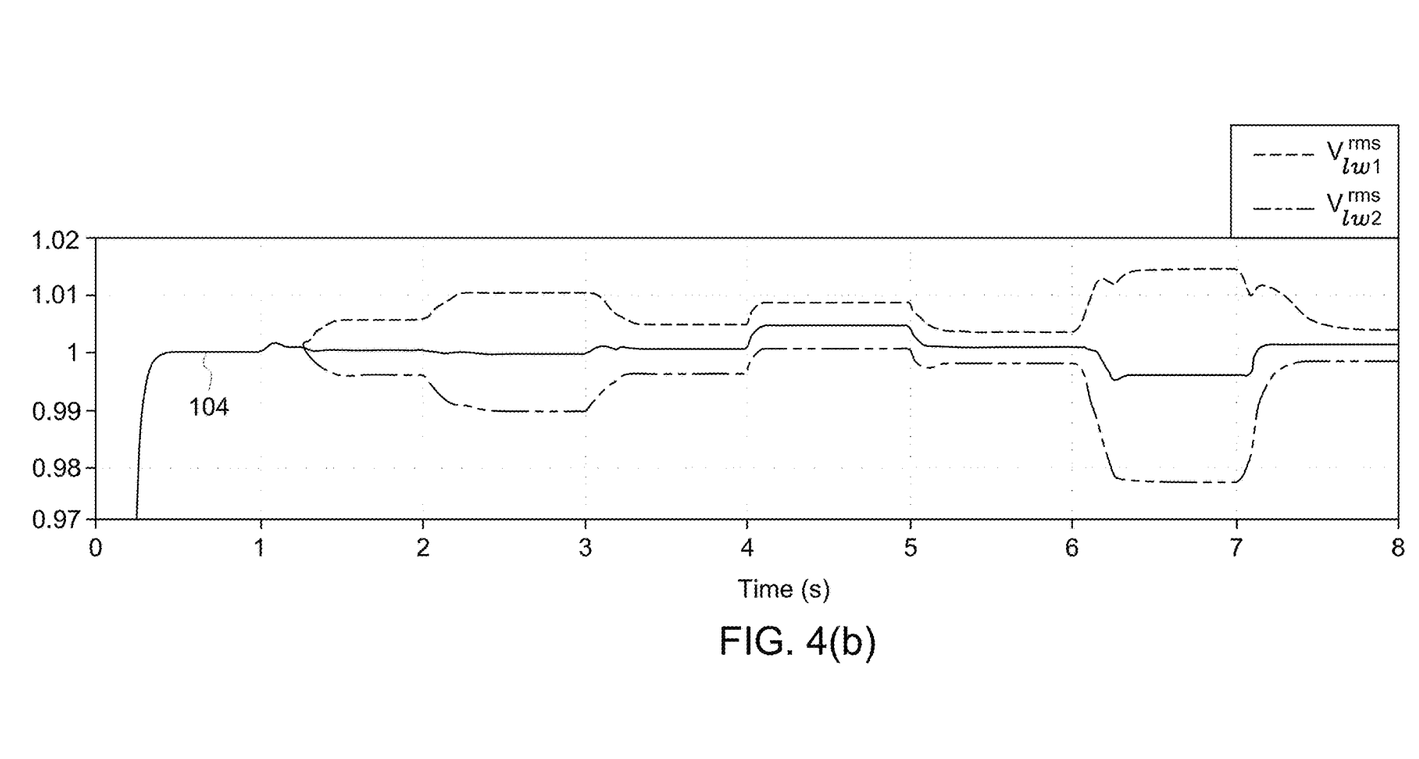
FIG. 4(b) shows the effect of adjusting a virtual voltage, in the manner shown in FIG. 4(c), on first and second AC network voltages in corresponding first and second AC transmission conduits within the power transmission network shown in FIG. 4(a)
Figure 4C:
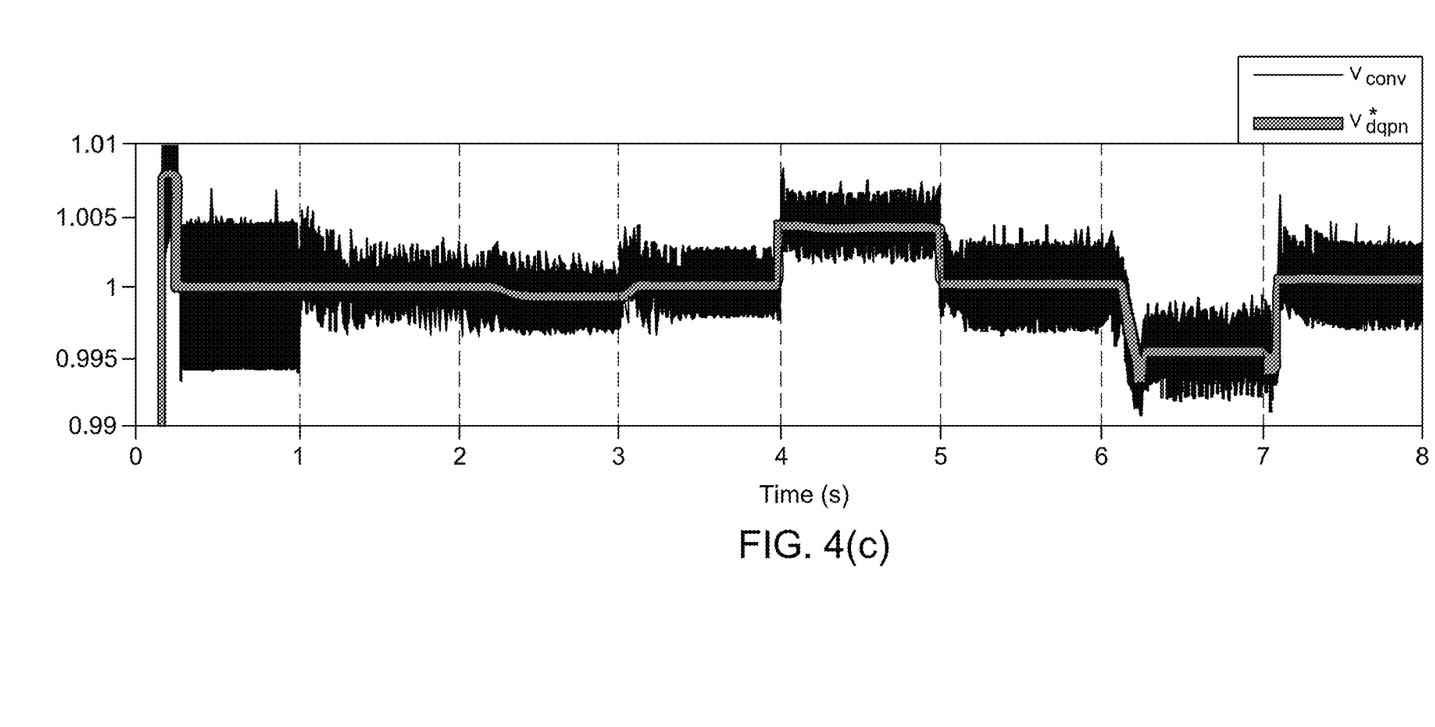
FIG. 4(c) shows the said adjustment of the virtual voltage.

Between zero and 1 second, the power converter 12 is charging up such that, as shown in FIG. 4(b), the actual average 104 of the first and second AC network voltages $v_{lw1}, v_{lw2}$ is increasing.

From 1 second to 2 seconds, power is running through the first and second wind parks $28_1, 28_2$, and each of the first and second AC network voltages $v_{lw1}, v_{lw2}$ (represented as corresponding first and second instantaneous average AC network voltages $v_{tw1}^{rms}, v_{tw2}^{rms}$ in FIG. 4(b)) is increasing. The average AC network voltage 104 remains essentially constant and, as shown in FIG. 4(c), the AC converter voltage $v_{conv}$ produced at the AC converter terminal 22 settles down, such that the virtual voltage reference vector $v_{dqpn}^*$ output by secondary converter controller 36, and used by the primary converter controller 34 to control the said AC converter voltage $v_{conv}$, is able also to remain essentially constant.

Between 2 and 3 seconds, the first AC network voltage $v_{lw1}$, i.e. the corresponding first instantaneous average AC network voltage $v_{tw1}^{rms}$, begins to increase above the predetermined voltage maximum $V_{max}$, i.e. begins to deviate, and so the secondary converter controller 36 acts to reduces the virtual voltage reference vector $v_{dqpn}^*$ which results in the primary converter controller 34 reducing the AC converter voltage vector $v_{convdqpn}$, which in turn reduces the AC converter voltage $v_{conv}$ produced by the power converter 12, and thereby reduces the average AC network voltage 104 to maintain the first AC network voltage $v_{lw1}$, i.e. the corresponding first instantaneous average AC network voltage $V_{tw1}^{rms}$, below the voltage maximum $V_{max}$.

Normal, safe operating of the second power transmission network 100 takes place between 3 and 4 seconds, with both the first and second AC network voltages $v_{tw1}, v_{tw2}$, i.e. the corresponding first and second instantaneous average AC network voltages $V_{tw1}^{rms}, V_{tw2}^{rms}$, remaining with the desired voltage range, i.e. between the voltage maximum $V_{max}$ and the voltage minimum $V_{min}$, and the average AC network voltage 104 remaining essentially constant.

At 4 seconds, the voltage minimum $V_{min}$ is artificially set at 1.0 pu, and the secondary converter controller 36 reacts by increasing the virtual voltage reference vector $v_{dqpn}^*$, which causes the primary converter controller 34 to increase the AC converter voltage $v_{conv}$ produced by the power converter 12 (by increasing the AC converter voltage vector $v_{convdqpn}$ it outputs) which, in turn, increases the average AC network voltage 104 and thereby lifts the second AC network voltage $v_{lw2}$, i.e. the corresponding second instantaneous average AC network voltage $V_{tw2}^{rms}$, above the temporarily revised voltage minimum $V_{min}$.

Between 5 and 6 seconds, the second power transmission network 100 returns again to normal, safe operation.

At 6 seconds, a critical deviation of the first and second AC network voltages $v_{lw1}, v_{lw2}$, i.e. the corresponding first and second instantaneous average AC network voltages $V_{tw1}^{rms}, V_{tw2}^{rms}$, is simulated in which the first AC network voltage $v_{lw1}$, i.e. the corresponding first instantaneous average AC network voltage $v_{tw1}^{rms}$, exceeds the voltage maximum $V_{max}$ and the second AC network voltage $v_{lw2}$, i.e. the corresponding second instantaneous average AC network voltage $V_{tw2}^{rms}$, falls below the voltage minimum $V_{min}$. In these circumstances the primary and second converter controllers 34, 36 again work together to alter, i.e. reduce, the AC converter voltage $v_{conv}$, produced by the power converter 12, and thereby reduce the average AC network voltage 104 in an effort to maintain the first and second AC network voltages $v_{lw1}$, $v_{lw2}$ within the desired voltage range limits set by the voltage maximum $V_{max}$ and the voltage minimum $V_{min}$.

Such control by the primary and second converter controllers 34, 36 is unable to maintain the first and second AC network voltages $v_{lw1}$, $v_{lw2}$ within the desired voltage range because the deviations are too great, but the secondary converter controller 36 does modify the virtual voltage reference vector $v_{dqpn}$* in a manner that equalises the amount each of the first and second AC network voltages $v_{lw1}$, $v_{lw2}$, i.e. the amount each of the first and second instantaneous average AC network voltages $V_{tw1}^{rms}$, $V_{tw2}^{rms}$, deviates from the corresponding voltage minimum $V_{min}$ and voltage maximum $V_{max}$.

The invention claimed is:

1. A power transmission network comprising a power converter having first and second DC converter terminals for connection in use to a DC network and an AC converter terminal electrically connected to a plurality of AC transmission conduits each of which is for connection in use to a respective AC network element configured to operate at a respective individual AC network voltage, the power converter including a primary converter controller programmed in use to control a transfer of power through the power converter and thereby between the DC network and the plurality of AC network elements, and the primary converter controller being further programmed in use to control each individual AC network voltage by establishing a virtual voltage representative of the plurality of AC network voltages and altering a single AC converter voltage produced by the power converter at the AC converter terminal to adjust the virtual voltage and thereby adjust each individual AC network voltage, wherein a secondary converter controller of the power transmission network receives in use a virtual voltage command from a higher-level controller and modifies the virtual voltage reference it establishes by determining an adjustment factor and applying the adjustment factor to the received virtual voltage command.

2. The power transmission network according to claim 1, wherein the primary converter controller is programmed to establish a virtual voltage commensurate with an average of the individual AC network voltages.

3. The power transmission network according to claim 1, wherein the primary converter controller is programmed to establish the virtual voltage in a vector form having real and imaginary parts.

4. The power transmission network according to claim 1, wherein the primary converter controller is additionally programmed to compare the established virtual voltage with a predetermined virtual voltage reference and to alter the AC converter voltage produced by the power converter to reduce any difference between the established virtual voltage and the predetermined virtual voltage reference.

5. The power transmission network according to claim 4, wherein when altering the AC converter voltage produced by the power converter to reduce any difference between the established virtual voltage and the predetermined virtual voltage reference, the primary converter controller takes into account:

a voltage difference across a converter reactance; and
a virtual voltage difference representative of a plurality of voltage differences across a conduit reactance of each AC transmission conduit.

6. The power transmission network according to claim 5, wherein the virtual voltage difference is commensurate with an average voltage difference across the conduit reactances of the AC transmission conduits.

7. The power transmission network according to claim 5, wherein the primary converter controller is programmed to take into account cross-coupling between the real and imaginary parts of the voltage difference and the virtual voltage difference.

8. The power transmission network according to claim 4, wherein the power converter further includes a secondary converter controller programmed in use to establish the predetermined virtual voltage reference against which the primary converter controller compares the established virtual voltage.

9. The power transmission network according to claim 1, wherein the second converter controller establishes the virtual voltage reference in a manner aimed at maintaining all of the individual AC network voltages within a desired voltage range.

10. The power transmission network according to claim 1, wherein the secondary converter controller:
considers whether any AC network voltage is below a predetermined voltage minimum and if one or more AC network voltages is below the voltage minimum modifies the virtual voltage reference to raise the or each errant AC network voltage to be equal to or above the voltage minimum; and
considers whether any AC network voltage is above a predetermined voltage maximum and if one or more AC network voltages is above the voltage maximum modifies the virtual voltage reference to reduce the or each errant AC network voltage to be equal to or below the voltage maximum.

11. The power transmission network according to claim 1, wherein if at least one AC network voltage is below the voltage minimum and at least one AC network voltage is above the voltage maximum, the secondary converter controller is programmed to modify the virtual voltage reference in a manner that equalizes the amount the or each of the AC network voltage deviates from the corresponding voltage minimum and voltage maximum.

12. A method of controlling a power transmission network comprising a power converter having first and second DC converter terminals for connection in use to a DC network and an AC converter terminal electrically connecting a converter reactance, comprising a series-connected converter inductance and converter resistance, to a plurality of conduit reactances, each comprising a series-connected conduit inductance and conduit resistance for a separate respective AC transmission conduit, wherein each separate respective AC transmission conduit is for connection in use to a separate respective AC network configured to operate at a respective individual AC network voltage based on a single AC converter voltage provided by the power converter, the power converter including a primary converter controller programmed in use to control a transfer of power through the power converter and thereby between the DC network and the plurality of conduit reactances, the method comprising:
controlling each individual AC network voltage by establishing a virtual voltage representative of the plurality of AC network voltages; and altering the single AC converter voltage produced by the power converter at the AC converter terminal to adjust the virtual voltage and thereby adjust each individual AC network voltage.

13. The method according to claim 12, further comprising establishing, with the primary converter controller, a virtual voltage commensurate with an average of the individual AC network voltages.

14. The method according to claim 12, further comprising establishing, with the primary converter controller, the virtual voltage in a vector form having real and imaginary parts.

15. The method according to claim 12, further comprising:
comparing, with the primary converter controller, the established virtual voltage with a predetermined virtual voltage reference; and
altering, with the primary converter controller, the AC converter voltage produced by the power converter to reduce any difference between the established virtual voltage and the predetermined virtual voltage reference.

16. The method according to claim 15, wherein when altering the AC converter voltage produced by the power converter to reduce any difference between the established virtual voltage and the predetermined virtual voltage reference, the primary converter controller takes into account:
a voltage difference across the converter reactance; and
a virtual voltage difference representative of a plurality of voltage differences across a conduit reactance of each respective AC transmission conduit.

17. The method according to claim 16, wherein the virtual voltage difference is commensurate with an average voltage difference across the conduit reactances of the separate respective AC transmission conduits.

18. The method according to claim 16, wherein the primary converter accounts for cross-coupling between the real and imaginary parts of the voltage difference and the virtual voltage difference.

19. The method according to claim 16, wherein the power converter further includes a secondary converter controller, the method further comprising:
establishing, using the secondary converter controller, the predetermined virtual voltage reference against which the primary converter controller compares the established virtual voltage.

20. The method according to claim 12, wherein the power converter further includes a secondary converter controller that:
considers whether any AC network voltage is below a predetermined voltage minimum and if one or more AC network voltages is below the voltage minimum modifies the virtual voltage reference to raise the or each errant AC network voltage to be equal to or above the voltage minimum; and
considers whether any AC network voltage is above a predetermined voltage maximum and if one or more AC network voltages is above the voltage maximum modifies the virtual voltage reference to reduce the or each errant AC network voltage to be equal to or below the voltage maximum.

* * * * *